United States Patent
Watanabe et al.

(10) Patent No.: US 6,188,194 B1
(45) Date of Patent: Feb. 13, 2001

(54) CONTROLLER FOR AUTOMATIC MACHINE

(75) Inventors: Atsushi Watanabe, Tokyo; Tetsuaki Kato, Hadano, both of (JP)

(73) Assignee: Fanuc Ltd., Yamanashi (JP)

( * ) Notice: Under 35 U.S.C. 154(b), the term of this patent shall be extended for 0 days.

(21) Appl. No.: 09/412,506

(22) Filed: Oct. 5, 1999

(30) Foreign Application Priority Data

Oct. 5, 1998 (JP) .................................................. 10-299088

(51) Int. Cl.$^7$ .................................................. G05B 11/32
(52) U.S. Cl. ...................... 318/625; 318/563; 318/568.24
(58) Field of Search .................. 318/563, 567, 318/565, 568.2, 568.11, 568.24, 569, 600–603, 625, 626, 635, 677–8, 49, 51, 53, 67, 112; 361/23, 28

(56) References Cited

U.S. PATENT DOCUMENTS

| | | | |
|---|---|---|---|
| 5,025,200 | * 6/1991 | Kurakake et al. | 318/625 |
| 5,463,296 | * 10/1995 | Fugere et al. | 318/625 |
| 5,723,959 | * 3/1998 | Iwata et al. | 318/447 |
| 5,898,284 | * 4/1999 | Sasajima | 318/287 |
| 5,912,541 | * 6/1999 | Bigler et al. | 318/600 |
| 5,977,735 | * 11/1999 | Aab | 318/563 |
| 6,008,605 | * 12/1999 | Weigel et al. | 318/625 |
| 6,091,219 | * 7/2000 | Maruo et al. | 318/625 |

* cited by examiner

Primary Examiner—David Martin
(74) Attorney, Agent, or Firm—Staas & Halsey, LLP

(57) ABSTRACT

An automatic machine has a plurality of axes driven by servo motors. The controller for controlling this automatic machine confirms that a compulsory power disconnection mode is engaged, releases the brakes and starts power supply to servo amplifiers. At a prescribed time after power supply to said servo amplifiers has started, the power supply to the servo amplifiers is halted compulsorily. Alternatively, the power supply to the servo amplifiers is halted compulsorily at a prescribed time after power supply to the servo amplifiers has started and after initial movement commands have been input to the servo controllers.

7 Claims, 3 Drawing Sheets ns to the pulse coders (position
CONTROLLER FOR AUTOMATIC MACHINE

BACKGROUND OF THE INVENTION

1. Field of the Invention

The present invention relates to a controller for an automatic machine comprising a plurality of servo controlled axes, such as an industrial robot (hereinafter, called "robot"), machine tool, or the like, and more particularly, to technology for avoiding dangers caused by malfunction occurring immediately after an automatic device is actuated, and for helping to eliminate the causes of same.

2. Description of the Related Art

In cases where malfunction occurs, for instance, due to deterioration of the electronic components in the servo amplifiers of servo motors driving the various axes of the robot or machine tool, the unit containing the components in question is replaced. When replacing the unit, the connections between the servo amplifiers and servo motors, or between the servo controllers and pulse coders (position detectors), or the like, are temporarily broken and then reconnected once the unit has been replaced. However, in some cases, these connections may be made incorrectly for some of the axes when this reconnection operation is performed.

FIG. 1A illustrates a case where connections are made correctly between devices constituting a servo system for a servo controlled first axis and second axis.

In FIG. 1A, the first axis servo control unit #1 reads in a first axis movement command created inside a controller (illustration of the entire controller omitted), and generates a torque command to be sent to servo amplifier A1, on the basis of the aforementioned movement command and a feedback signal from a pulse coder P1 appended to a first axis servo motor M1. On the basis of the torque command from servo controller #1, the servo amplifier A1 generates a drive current to be supplied to the first servo motor M1. The first axis pulse coder P1 outputs information relating to the position or speed of the first axis to the first axis servo controller #1, in the form of a feedback signal. In the foregoing, the servo system relating to the first axis has been described, and since the servo system for the second axis is the same as that for the first axis, description thereof has been omitted here.

FIG. 1B shows a first example of a case where connections are made incorrectly between devices constituting a servo system for a servo controlled first axis and second axis.

In the example shown in FIG. 1B, the axis correspondences in the connections between the servo controllers and the servo amplifiers have been made incorrectly. If the machine is actuated in this state, the output from the first axis servo controller #1 is transmitted to the second axis servo amplifier A2, and the output from the second axis servo controller #2 is transmitted to the first axis servo amplifier A1.

Consequently, the first axis servo motor M1 operates in accordance with the movement command for the second axis. The pulse coder P1, meanwhile, outputs positional information for the servo motor M1, which operates according to this command, to the servo controller #1. The servo controller #1 generates an output seeking to reduce the positional deviation to zero, but this output is transmitted to the second axis servo amplifier A2, rather than the first axis servo amplifier A1. Therefore, the servo system seeking to reduce the positional deviation to zero will not function and the servo motor M1 will perform completely unexpected and unregulated actions, and depending on circumstances, the probability of runaway operation may be high. There is also a similar risk of runaway operation with regard to the second axis servo motor M2.

Moreover, in a case where, for example, gravitational force or a moment due to gravity is acting on the second axis of a robot, or the like, then even if no command is input, due to the action of gravitational force or the moment due to gravity, an output seeking to reduce the positional deviation to zero will be transmitted to the first axis, and hence there is a risk of the first axis servo motor M1 performing runaway operation.

FIG. 1C shows a second example of a case where connections are made incorrectly between devices constituting a servo system for a servo controlled first axis and second axis.

In the example shown in FIG. 1C, the axis correspondences in the connections between the servo amplifiers and the servo motors have been made incorrectly.

FIG. 1D shows a third example of a case where connections are made incorrectly between devices constituting a servo system for a servo controlled first axis and second axis.

In the example shown in FIG. 1D, the axis correspondences in the connections between the servo motors and the servo controllers have been made incorrectly.

In both the second and third examples where connections have been made incorrectly between devices constituting a servo system for a servo controlled first axis and second axis similarly to the first example, the servo system does not function correctly, and there is danger of servo motors M1 and M2 performing runaway operation.

With regard to the characteristics of a servo system, there is a high probability that the malfunction caused by incorrect connection between the devices constituting a servo system for a plurality of servo controlled axes, as illustrated in the examples in FIG. 1B–FIG. 1D, will arise immediately after the start of the machine. More particularly, in systems incorporating an axis that is subjected to gravitational force or a moment due to gravity, there is a high probability of malfunction occurring immediately after the brakes are released, and in systems which do not incorporate an axis that is subjected to gravitational force or a moment due to gravity, there is a high probability of malfunction occurring immediately after a movement command has been issued.

The reason for this is that since the servo controller generates an output which seeks to make the deviation (difference between command value and feedback value from pulse coder) converge to zero as quickly as possible, then there is a high probability that the system will diverge very rapidly, without achieving convergence, if incorrect connections are made as described above. Moreover, even if there are no incorrect connections as described above and the operator actuates the machine without being aware of the occurrence of deterioration, faults, or the like, in the electronic components, then similar malfunction may be liable to occur.

In order to deal with the problem of malfunctions of this kind, a teaching pendant fitted with a dead-man switch is connected to a controller for a robot, in such a manner that the robot can be brought to an emergency halt by means of the operator releasing (ceasing to depress) the dead-man switch.

However, in a case where the robot runs out of control immediately after the start, for one of the reasons described above, there is a danger of an accident occurring before the operator is able to react. Moreover, in a controller for a machine tool, no means are known for dealing immediately and reliably with a malfunction occurring unexpectedly immediately after the start of the machine tool.

OBJECTS AND SUMMARY OF THE INVENTION

It is an object of the present invention to provide a controller for an automatic machine, such as a robot, machine tool, or the like, comprising a plurality of axes driven by servo motors, which prepares against malfunction (in particular, runaway operation) immediately after the start of the automatic machine, as may occur, for instance, due to incorrect connection between the various devices constituting the servo system including the servo motors, and thereby prevents such malfunctions from expanding and developing into serious situations. Moreover, in addition to preventing such malfunctions from expanding, it is also an object of the present invention to infer the cause of a malfunction and notify same to the operator.

In order to achieve the aforementioned objects, a controller for an automatic machine according to a first embodiment has a plurality of axes driven by servo motors, and comprises compulsory power disconnection means for compulsorily disconnecting the power supply to servo amplifiers which supply power to the servo motors, at a prescribed time after the power supply to the servo amplifiers has started.

A controller for an automatic machine according to a second embodiment has a plurality of axes driven by servo motors and comprises compulsory power disconnection means for compulsorily disconnecting the power supply to servo amplifiers, at a prescribed time after the power supply to the servo amplifiers has started and after movement commands have been input to servo controllers which generate torque commands that are transmitted to the servo amplifiers.

Preferably, internal data from the servo system used as indicators for judging whether or not each of said axes is operating abnormally is recorded whilst the power supply to said servo amplifiers is switched on, and said recorded data is output as a message. Furthermore, preferably, the presence or absence of an abnormality in each of said axes is judged on the basis of said recorded data, and said judgement results are output in the form of a message.

Preferably, immediately after compulsory disconnection of the power supply to the servo amplifiers by operation of the compulsory power disconnection means, the falling or rotation of members due to gravitational force is prevented by activating braking means attached to each axis.

Moreover, preferably, it is possible to switch the compulsory power disconnection means between an activated state and a deactivated state. Once compulsory power disconnection processing has been implemented and the cause of an abnormality has been eliminated, normal operation is conducted without the compulsory power disconnection means being operated thereafter. If the controller according to the present invention is used, a robot or machine tool starts to malfunction immediately after it is actuated, due to incorrect connections being made between the machines (including servo motors) constituting the servo system, it is possible to prevent situations leading to human injury, damage to peripheral devices, or the like. Moreover, since an abnormality message can be output in a form containing information relating to the axis where an abnormality arises, the cause of any abnormality that arises can be investigated and eliminated readily.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1A:
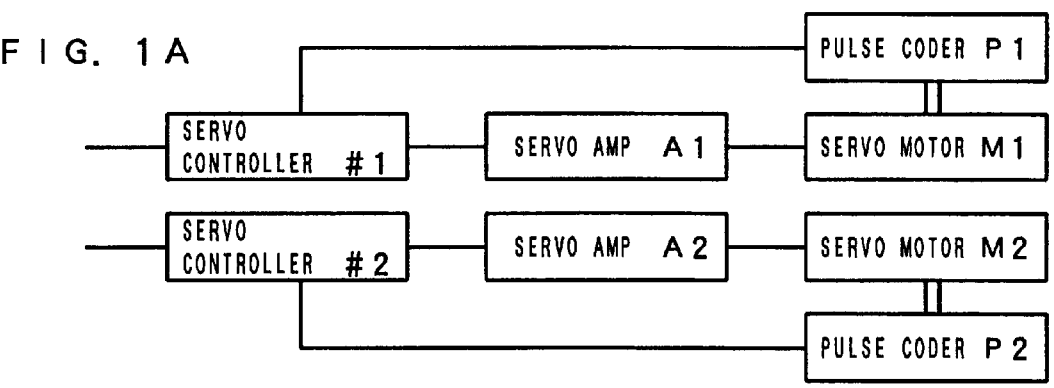
FIG. 1A is a controller for an automatic machine comprising a first axis and a second axis driven respectively by servo motors, wherein connections are made correctly between the various devices comprising the servo system.

The controller for an automatic machine according to the present invention can be composed by installing software in a hardware composition.

Firstly, the hardware composition of a controller controlling a robot (as an example of an automatic machine) having n axes (where $n \leq 3$) driven by servo motors will be described.

A memory 102, teaching pendant interface 103, servo control unit 105, and an external device input/output interface 106 are connected respectively to a bus 107, which is linked to the main CPU 101 (hereinafter, simply called "CPU".) The memory 102 contains a RAM, ROM, non-volatile memory, and the like.

The teaching pendant 104 is connected to the teaching pendant interface 103. This teaching pendant 104 comprises standard display functions, and the operator is able to create, revise and save operating programs for the robot, and to set various parameters relating to same by means of manual operation of the teaching pendant 104, in addition to which he or she can implement a replay of a designated operating program, skip jog feeding, or the like. Moreover, the display on the teaching pendant 104 is also used for displaying the results of abnormality checks made immediately after the start of the robot (described later).

A system program supporting the basic functions of the robot and robot controller is stored in the ROM in the memory 102. Moreover, robot operating programs and related data settings specified according to the application are stored in the non-volatile memory in the memory 102. Program-related data for compulsory measures implemented immediately after the start of a robot, as described later, is also stored in this non-volatile memory. The RAM in the memory 102 is used for temporary storage of data used in the various computational processes performed by the CPU 101.

The servo control unit 105 comprises n servo controllers #1–#n according to the number of axes in the robot. These servo controller receive movement command generated by computational processing for controlling the robot (such as travel path planning, or interpolation or inverse conversion on the basis of the travel path planning), and generate torque commands to be transmitted to the servo amplifiers A1–An, from the aforementioned movement commands and feedback signals received from pulse coders P1–Pn attached to each axis. Upon receiving these torque commands from the servo controllers #1–#n, the servo amplifiers A1–An supply current to servo motors M1–Mn relating to each axis on the basis of the torque commands, thereby driving the motors.

However, as described above, there is a possibility that an error may occur in the state of connections among the servo controllers #1–#n, servo amplifiers A1–An, servo motors M1–Mn, and pulse coders P1–Pn. If an incorrect connection is made, then the connection relationship illustrated in FIG. 2 will not be established for that machine. Moreover, as commonly known, although not illustrated in the drawings, a braking mechanism, such as an electromagnetic brake, or the like, is attached to each axis of the robot, and this mechanism can be set to a released (open) or active (closed) state at any time by means of commands from the robot controller.

Here, a first example of compulsory power disconnection processing implemented by a controller immediately after the start of the robot will be described with reference to the flowchart in FIG. 3.

In this first processing example, the power supply to the servo amplifiers is halted compulsorily, immediately after the start of the robot, and data used for a safety confirmation is shown on the display of the teaching pendant 104 at this time. This processing can be applied to the robot in question in cases where none of the plurality of axes (axis 1 to axis n) of the robot is receiving the effect of a gravitational force or a moment due to gravity which is greater than a negligible value.

Figure 3:
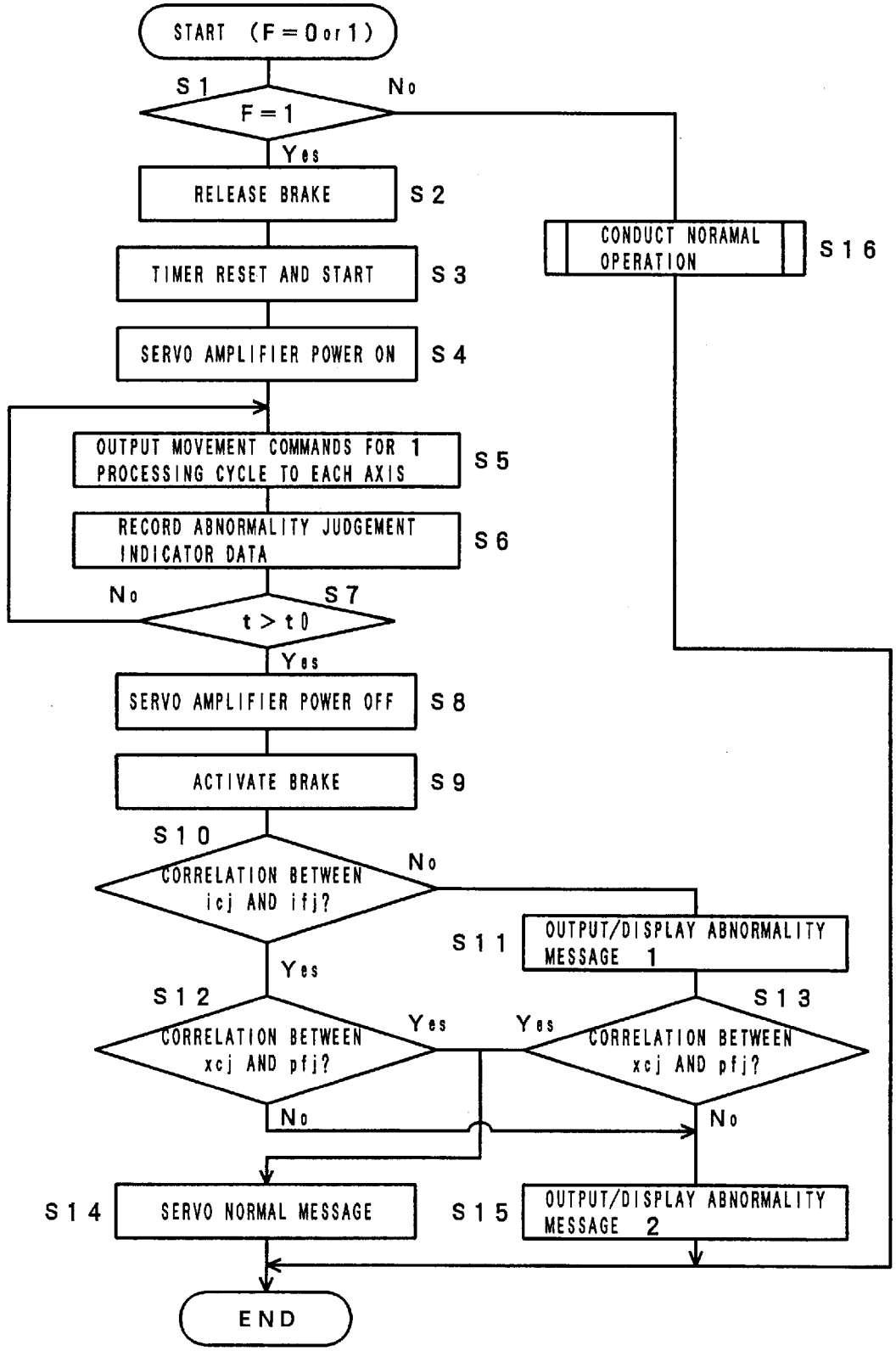
FIG. 3 is a flowchart illustrating one example of a compulsory power disconnection process immediately after the start of a robot, as implemented conjointly by the main CPU and a servo CPU relating to any one of the axes in the controller in FIG. 2.

The processing illustrated by the flowchart in FIG. 3 is implemented conjointly by the main CPU 101 and the CPUs (servo CPUs) in the servo controllers #1–#n. Moreover, the compulsory power disconnection processing immediately after the start of the robot, which is a feature of the present invention, may be implemented by previously setting a compulsory power disconnection mode flag F (F=1). If this flag is reset (F=0), then the compulsory power disconnection mode is released, and no compulsory power disconnection processing is implemented. In order to ensure safety, it is desirable that the flag is always set (F=1) at the start of the robot.

The processing illustrated in the flowchart in FIG. 3 is initiated when the robot controller is instructed, by operation of the teaching pendant 104, to start implementation of the operating program, in a state where power for signal processing, such as operation of the servo CPUs inside the servo controller #1 to #n, is being supplied. Thereafter, the processing in each step of the flowchart is as follows.

(Step S1) It is checked whether or not the mode flag F is set. Unless compulsory power disconnection mode is released (in other words, providing that F=1), the sequence proceeds to step S2. If the compulsory power disconnection mode is released (F=0), then the sequence proceeds to step S16 (normal operation).

(Step S2) Each of the brakes attached to the various axes is released (opened).

(Step S3) In order to measure elapsed time since the start of the timer is reset (t=0) and a count is initiated.

(Step S4) Power supply to the servo amplifiers A1–An is started.

(Step S5) For each of axis 1 to axis n, movement commands for one process cycle (one interpolation cycle) are generated by numerical control functions of the robot controller (e.g., decoding of operating program, plotting of path of travel, interpolation, acceleration/deceleration processing, distribution to individual axis, etc.) and output to servo controllers #1–#n. From these movement commands and the feedback signals received from the pulse coders P1–Pn, the servo controllers #1–#n then generate torque commands to be transmitted to the servo amplifiers A1–An.

Upon receiving these torque commands from the servo controllers #1–#n, the servo amplifiers A1–An supply drive currents to the servo motors M1–Mn relating to axis 1–axis n, on the basis of the torque commands. Thereby, operation of each axis of the robot is initiated.

Figure 1B:
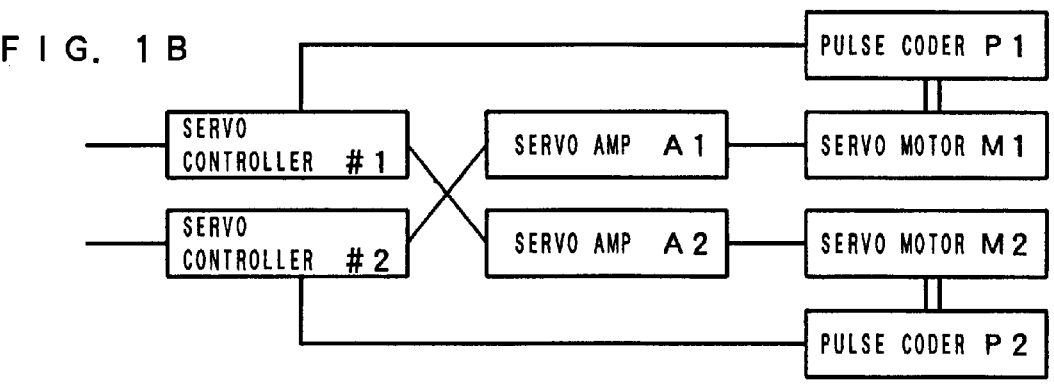
FIG. 1B shows an example of the servo system in FIG. 1A, wherein the servo controllers and servo amplifiers constituting the aforementioned servo system are connected incorrectly.
Figure 1C:
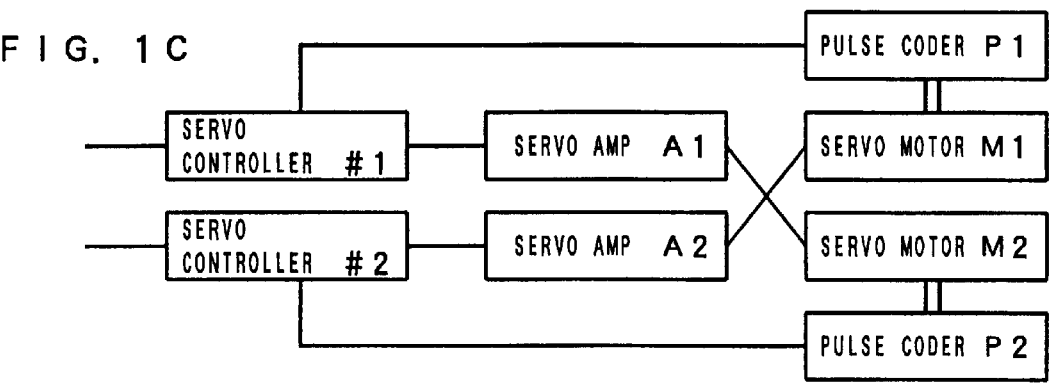
FIG. 1C shows an example of the servo system in FIG. 1A, wherein the servo amplifiers and servo motors constituting the aforementioned servo system are connected incorrectly.
Figure 1D:
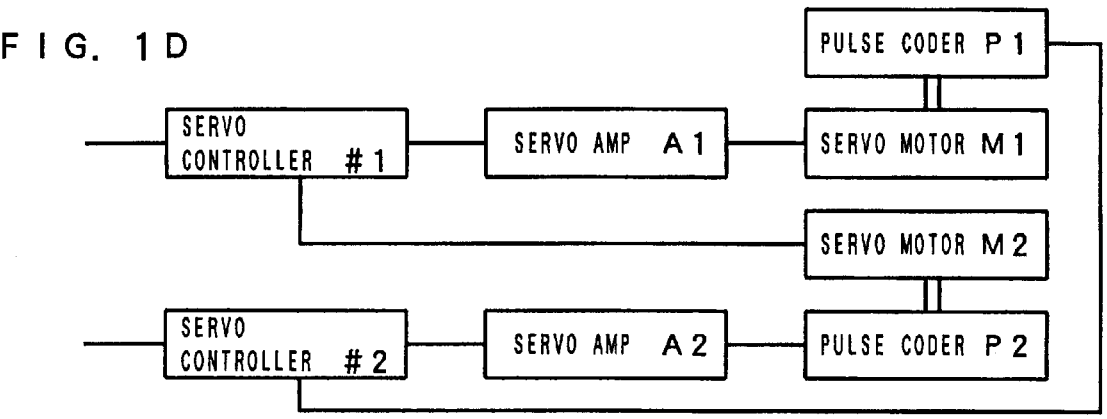
FIG. 1D shows an example of the servo system in FIG. 1A, wherein the servo controllers and pulse coders constituting the aforementioned servo system are connected incorrectly.
Figure 2:
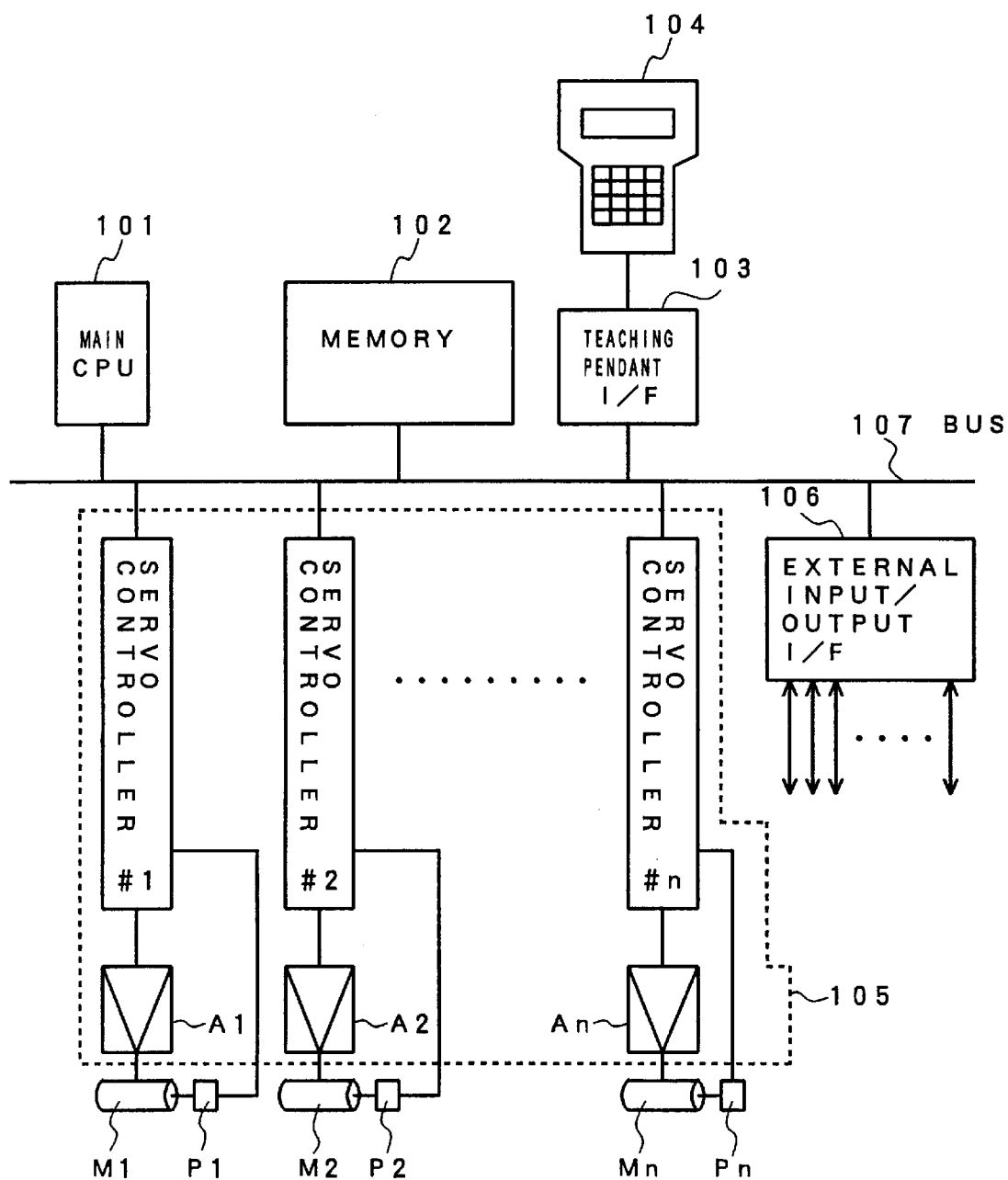
FIG. 2 is a principal block diagram showing the general hardware composition of a controller according to the present invention, when applied as a controller for a robot.

Incidentally, it should be noted that the servo control unit 105 illustrated in FIG. 2 may undergo some incorrect connections such as those illustrated in FIG. 1B–FIG. 1D among the various devices constituting the servo system.

(Step S6) In order to determine whether there is an abnormality in the state of the servo system arising from implementation of step S5, internal data representing abnormality indicators is read in and stored in the non-volatile memory of memory 102 (FIG. 2). In concrete terms, for each axis (axis j, where j=1, 2, . . . , n), the latest torque command value (current command value) $ic_j$ and the latest current feedback value $if_j$ are stored along with the latest movement command value (accumulated value) $xc_j$ and the latest position feedback value $xf_j$.

(Step S7) The count value t of the timer is checked. If the count value is less than a predetermined value t0, then processing in step S5 and step S6 is implemented for the subsequent cycle. In this way, the processing in step S5 and step S6 is repeated for each processing cycle until t becomes t>t0, whereupon the sequence proceeds to step S7 and step S8. Here, in design terms, the set time t0 is generally set to a very short time, within a range whereby malfunction of the robot will not expand in scope even if an incorrect connection is made. For example, t0 is set to the time period taken for movement commands (step S5) for several-several ten processing cycles to be output.

(Step S8) The power supply to the servo amplifiers A1–An is compulsorily interrupted. However, a power supply for signal processing, such as operation of the servo CPUs in the servo controllers #1–#n is maintained.

(Step S9) The brakes attached to the respective axes are activated (closed).

(Step S10) For each axis (axis j:j=1, 2, . . . , n), the correlation between the latest torque command value (current command value) $ic_j$ and the latest feedback value $if_j$ is checked.

If the servo motors, servo amplifiers, servo controllers and pulse coders constituting the servo system are connected correctly for that axis j (corresponding to the example in FIG. 1A), then the deviation between the torque command value (current command value) $ic_j$ and the current feedback value $if_j$ will become a small value, since the servo system works to make this deviation zero. In other words, there is a correlation between the torque command value $ic_j$ and the current feedback value ifj. In this case, the processing sequence advances to step S12.

If, on the other hand, the servo controller for axis k (which is different to axis j) is mistakenly connected to the servo amplifier for axis j, due to a work error, (corresponding to the example in FIG. 1B), then there will be no correlation between the torque command value icj and the current feedback value ifj for axis j (and axis k), and hence it is highly probable that a large discrepancy exceeding the normal range of deviation will be detected between these two values. In this case, the processing sequence proceeds to step S11.

(Step S11) An abnormality message 1 is output, and this message is displayed, for example, on the display screen of the teaching pendant 104. The displayed abnormality message 1 contains the number j of the axis at which an abnormality has been detected. This abnormality message 1 informs the operator that the servo controller and servo amplifier relating to that axis j may be connected incorrectly. However, this abnormality message 1 is also issued in the case of other abnormalities, for instance, when the current feedback value ifj itself is abnormal due to a fault in the electronic components. Moreover, the internal data (torque command value icj and current feedback value ifj) representing abnormality indicators gathered at step S6 is also displayed on the screen of the teaching pendant 104.

When the processing in step S11 has been completed, the processing sequence advances to step S13.

(Step S12/Step S13) For each axis (axis j, where j=1, 2, ... , n), the correlation between the latest movement command value (integrated value) xcj and the latest position feedback value xfj is checked.

If the servo motors, servo amplifiers, servo controllers and pulse coders constituting the servo system are connected correctly with respect to axis j (corresponding to the example in FIG. 1A), then the deviation between the movement command xcj and the position feedback value xfj will converge within a prescribed range. In other words, there is a correlation between the movement command value xcj and the position feedback value xfj. In this case, the processing sequence advances to step S14.

If, on the other hand, the servo motor for axis k (which is different to axis j) is mistakenly connected to the servo amplifier for axis j, due to a work error, (corresponding to the example in FIG. 1C), or if the pulse coder for axis k (which is different to axis j) is mistakenly connected to the servo controller for axis j, (corresponding to the example in FIG. 1D), then the deviation between the movement command value xcj and the position feedback value xfj will be a large value exceeding the normal deviation. In this case, the processing sequence advances to step S15.

(Step S14) A message is output indicating that the servo system is normal, and this message is displayed by the teaching pendant 104, for example, whereupon the compulsory power disconnection processing sequence ends.

(Step S15) An abnormality message 2 is output and displayed on the screen of the teaching pendant 104, for example, whereupon the compulsory power disconnection processing sequence ends. The displayed abnormality message 2 contains the number j of the axis at which the abnormality has been detected. This abnormality message 2 informs the operator that either the servo amplifier and servo motor, or the pulse coder and servo controller, for that axis j, have been connected incorrectly. However, this abnormality message 2 is also issued in the case of other abnormalities, for instance, when the position feedback value xfj itself is incorrect due to a fault in the pulse coder. Moreover, the internal data (position command value xcj and position feedback value xfj) forming the abnormality indicators gathered at step S6 is also displayed on the screen of the teaching pendant 104.

(Step S16) Normal operation is executed. The details of processing for normal operation are commonly known, and since they do not relate to the essence or distinctive features of the present invention, description thereof is omitted here.

Once the compulsory power disconnection processing immediately after robot actuation, as illustrated by the flowchart in FIG. 3 above, has been completed for all axes, the operator undertakes the following steps, depending on the results of this processing.

(a) If a message indicating that the servo system is normal is output at step S14: The operator deactivates the compulsory power disconnection mode by resetting the mode flag F (F=0) which was set (F=1) at the time of completion of compulsory power disconnection processing, whereupon normal operation is followed.

(b) If an abnormality message 1 is output for axis j at step S11: The operator checks whether or not the servo controller and servo amplifier for that axis j (and for other axes) have been connected incorrectly.

(b1) If the check reveals that an error has been made in the connection between the servo controller and servo amplifier, then the operator corrects the connection and then implements the compulsory power disconnection processing illustrated in the flowchart in FIG. 3 once again. If a message indicating that the servo system is normal is output at step S14 when this processing is repeated, then the flag F which is currently set (F=1) is reset (F=0), thereby deactivating the compulsory power disconnection mode. If, on the other hand, the abnormality message 1 is output again at step S11, then the operator infers that one of the actual devices is not functioning correctly, and he or she takes corresponding action (for example, a circuit inspection).

(b2) If the check reveals that no incorrect connections have been made between the servo controllers and the servo amplifiers, then the operator infers that one of the actual devices is not functioning correctly, and he or she takes corresponding action (for example, a circuit inspection).

(c) If the abnormality message 2 is output with respect to axis j at step S15: The operator checks respectively for errors in the connections between the servo amplifier and servo motor and between the pulse coder and servo controller relating to axis j (and also relating to other axes).

(c1) If the check reveals that an incorrect connection has been made between the servo amplifier and servo motor or between the pulse coder and the servo controller, then the operator corrects the connections and then implements the compulsory power disconnection processing illustrated by the flowchart in FIG. 3 once again. If a message indicating that the servo system is normal is output at step S14 when this processing is implemented again, then the flag F which is currently set (F=1) is reset (F=0), thereby deactivating the compulsory power disconnection mode. On the other hand, if the abnormality message 2 is output again at step S15, then the operator infers that one of the actual devices is not functioning correctly, and he or she takes corresponding action (for example, a circuit inspection or pulse coder inspection).

(c2) If the check reveals that no incorrect connection has been made between the servo amplifier and servo motor, or between the pulse coder and servo controller, then the operator infers that one of the actual devices is not functioning correctly, and he or she takes corresponding action (for example, a circuit inspection or pulse coder inspection).

The compulsory power disconnection processing implemented by the controller immediately after actuation of the robot, as described above with reference to the flowchart in FIG. 3, is applied to a robot in cases where none of the plurality of axes of the robot (axis 1 to axis n) is subjected to a gravitational force or a moment due to gravity which is greater than a negligible value.

If, on the other hand, one of the plurality of axes of the robot (axis 1 to axis n) is subjected to a gravitational force or a moment due to gravity which is greater than a negligible value, then a second example of compulsory power disconnection processing implemented by the controller immediately after actuation of the robot is applied to the robot, as described below.

Here, a second example of compulsory power disconnection processing implemented by the controller immediately after robot actuation is described.

The compulsory power disconnection processing according to this second example involves a slight revision to the processing in the first example described with reference to the flowchart in FIG. 3. Specifically, in the compulsory power disconnection processing in this second example, processing at step S5 of the flowchart in FIG. 3 are unnecessary, and hence this step is skipped.

Consequently, in the processing in the second example, the timer is started at step S3 of the flowchart in FIG. 3, power supply to the servo amplifiers A1–An is initiated subsequently at step S4, data repressing abnormality indicators are obtained and stored at the next step S6, and then, the count value t of the timer is checked at the next step S7. The processing at step S6 and step S7 is repeated, provided that the timer count value t is at or below a predetermined value t0. When the time count value t exceeds the predetermined value t0 (result Yes at step S7), then the power to servo amplifiers A1–An is compulsorily disconnected at step 8. As the processing at step S9 and, subsequent steps are identical to those of the first example, these descriptions are omitted here.

In this case also, it is designed that the set value t0 is set to short time in such a manner that even if an incorrect connection is made between the devices constituting the servo system, it is still possible to prevent expansion of a malfunction originating, for example, in the gravitational downward movement of a robot arm.

Further, as modification of the compulsory power disconnection processing according to this second example,. processing at step S6, in addition to step S5, may also be skipped so that any internal data representing abnormality indicator are not obtained. As a result of skip of step S6, processing at step S10 to S15 in FIG. 3 are not executed. Therefore, according to this modification of the second example, neither the correlation between movement command value (which is zero) and the latest position feedback value nor the correlation between current command value (which is zero) and the latest current feedback value are checked.

According to this modification of the second example, after the controller is switched to a compulsory power disconnection mode, the bakes are released, and then power supply to the servo amplifiers A1–An are started. Then, after the lapse of a predetermined time, power supply to the servo amplifiers A1–An is automatically stopped and the brakes are applied, whereupon this processing is completed. During that processing, an operator will carefully watch a course of movement of the robot and determine whether abnormal movement for any of the servo motors has occurred or not.

Moreover, in the flowchart in FIG. 3, step S2–step S9 (part or all thereof) can be implemented by means of hardware (circuit operation independent of CPU processing) instead of software processing. In the embodiment described above, it was supposed that the automatic device was a robot comprising n axes (where $n \leq 2$), but naturally a similar action to that in the aforementioned embodiment can be obtained in an automatic machine other than a robot.

What is claimed is:

1. A controller for an automatic machine having a plurality of axes each driven by a respective one of a plurality of servo motors each having a position detector, comprising:

a plurality of servo controllers receiving positional information fed back from respective ones of the position detectors;

a plurality of servo amplifiers supplying power to respective ones of said servo motors; and a compulsory power disconnector compulsorily disconnecting a power supply to said servo amplifiers at a prescribed time after the power supply to said servo amplifiers has started and after movement commands have been input to respective ones of said servo controllers.

2. A controller for an automatic machine having a plurality of axes each driven by a respective one of a plurality of servo motors, each having a position detector, comprising:

a plurality of servo controllers receiving positional information fed back from respective one of the position detectors;

a plurality of servo amplifiers supplying power to respective ones of said servo motors; and a compulsory power disconnector compulsorily disconnecting a power supply to said servo amplifiers at a prescribed time after power supply to said servo amplifiers has started.

3. The controller for an automatic machine according to claim 1 or 2, wherein measurements from the respective ones of the servo motors, servo amplifiers and position detectors are used as indicators to judge whether the respective axes are operating abnormally, the measurements being recorded by a CPU whilst the power supply to said servo amplifiers is switched on.

4. The controller for an automatic machine according to claim 1 or 2, wherein measurements from the respective ones of the servo motors, servo amplifiers and position detectors are used as indicators to judge whether the respective axes are operating abnormally, the measurements being recorded by a CPU whilst the power supply to said servo amplifiers is switched on, and said recorded measurements are output as a message by the CPU.

5. The controller for an automatic machine according to claim 1 or 2, wherein measurements from the respective ones of the servo motors, servo amplifiers and position detectors are used as indicators to judge whether the respective axes are operating abnormally, the measurements being recorded by a CPU whilst the power supply to said servo amplifiers is switched on, the presence or absence of an abnormality in each of said plurality of axes is judged on the basis of said recorded measurements and said judgement results are output in the form of a message by the CPU.

6. The controller for an automatic machine according to claim 1 or 2, wherein said compulsory power disconnection means can be deactivated.

7. The controller for an automatic machine according to claim 1 or 2, wherein braking means attached to each of said axes is activated after the power supply to said servo amplifiers has been compulsorily disconnected.

* * * * *

UNITED STATES PATENT AND TRADEMARK OFFICE
CERTIFICATE OF CORRECTION

PATENT NO. : 6,188,194 B1
DATED : February 13, 2001
INVENTOR(S) : Atsushi Watanabe, et al.

It is certified that error appears in the above-identified patent and that said Letters Patent is hereby corrected as shown below:

Column 4,
Line 42, change "$\leq$" to -- $\geq$ --

Column 10,
Line 4, change "$\leq$" to -- $\geq$ --

Signed and Sealed this

Second Day of October, 2001

*Attest:*

*Attesting Officer*

NICHOLAS P. GODICI
*Acting Director of the United States Patent and Trademark Office*